(12) United States Patent
Wolkerstorfer

(10) Patent No.: US 8,596,952 B2
(45) Date of Patent: Dec. 3, 2013

(54) METHOD AND TRANSPORT DEVICE FOR POSITIONING LOADING AIDS PRIOR TO THE TRANSFER THEREOF INTO A SHELF

(75) Inventor: Christoph Wolkerstorfer, Wels (AT)

(73) Assignee: TGW Mechanics GmbH, Wels (AT)

( * ) Notice: Subject to any disclaimer, the term of this patent is extended or adjusted under 35 U.S.C. 154(b) by 224 days.

(21) Appl. No.: 12/735,330

(22) PCT Filed: Jan. 9, 2009

(86) PCT No.: PCT/AT2009/000006
§ 371 (c)(1), (2), (4) Date: Jul. 2, 2010

(87) PCT Pub. No.: WO2009/086578
PCT Pub. Date: Jul. 16, 2009

(65) Prior Publication Data
US 2010/0272546 A1    Oct. 28, 2010

(30) Foreign Application Priority Data
Jan. 11, 2008 (AT) .................................. A 43/2008

(51) Int. Cl.
*B65G 1/04* (2006.01)

(52) U.S. Cl.
USPC .......................................... 414/807; 414/280

(58) Field of Classification Search
USPC ........................ 414/277, 280, 807; 198/419.1, 198/459.6–459.7
See application file for complete search history.

(56) References Cited

U.S. PATENT DOCUMENTS

| | | | |
|---|---|---|---|
| 3,596,789 A * | 8/1971 | Aaronson et al. | 414/662 |
| 3,883,008 A * | 5/1975 | Castaldi | 414/270 |
| 5,009,509 A | 4/1991 | Matoushek et al. | |
| 5,070,992 A * | 12/1991 | Bonkowski | 198/419.1 |

(Continued)

FOREIGN PATENT DOCUMENTS

| | | |
|---|---|---|
| DE | 33 00 441 | 9/1984 |
| DE | 40 33 184 A1 | 4/1992 |

(Continued)

OTHER PUBLICATIONS

International Search Report.

*Primary Examiner* — Jonathan Snelting
(74) *Attorney, Agent, or Firm* — Collard & Roe, P.C.

(57) ABSTRACT

The invention relates to a method and a transport device (207) for positioning loading aids (208) prior to the transfer thereof into a shelf compartment (209) on storage spaces (211a to 211d) arranged behind one another using a transport device (207). The loading aids (208) are positioned against one another, behind one another against a first stop device (243 to 247) of the transport device (207) in the transfer direction (210), then a separating device (256, 257) is adjusted in the movement path (251) between the loading aids (208) and the front loading aid (208) in the transfer direction (210) is positioned against the separating device (256, 257) and the rear loading aid (208) in the transfer direction (210) is positioned against a second stop device (243 to 247) of the transport device (207) in the transfer direction (210). Afterwards a third stop device (243 to 247) is adjusted between the separated loading aids (208).

5 Claims, 18 Drawing Sheets

(56) References Cited

U.S. PATENT DOCUMENTS

| | | | |
|---|---|---|---|
| 5,839,872 A * | 11/1998 | Goto et al. | 414/280 |
| 6,112,915 A | 9/2000 | Lewis | |
| 6,431,378 B1 | 8/2002 | Lewis | |
| 7,128,521 B2 | 10/2006 | Hansl | |
| 7,771,152 B2 | 8/2010 | Waltersbacher | |
| 2002/0037208 A1 | 3/2002 | Patrito | |
| 2003/0185656 A1 | 10/2003 | Hansl | |
| 2004/0069181 A1 | 4/2004 | Charbonneau et al. | |
| 2005/0095095 A1 | 5/2005 | Hansl | |
| 2006/0245862 A1* | 11/2006 | Hansl et al. | 414/281 |
| 2006/0285947 A1* | 12/2006 | Hansl et al. | 414/277 |
| 2007/0116544 A1 | 5/2007 | Ragessi | |
| 2007/0125727 A1 | 6/2007 | Winkler | |

FOREIGN PATENT DOCUMENTS

| | | |
|---|---|---|
| DE | 93 19 511 U1 | 2/1994 |
| DE | 44 22 240 | 1/1995 |
| DE | 94 07 646 | 8/1995 |
| DE | 203 03 376 | 5/2003 |
| EP | 0 647 575 | 4/1995 |
| EP | 0 733 563 | 9/1996 |
| EP | 0 775 665 | 5/1997 |
| EP | 1 764 317 | 3/2007 |
| EP | 1 772 400 | 4/2007 |
| EP | 1 795 464 A2 | 6/2007 |
| GB | 2 280 178 | 1/1995 |
| JP | 8-290805 A | 11/1996 |
| WO | WO 99/30596 | 6/1999 |

* cited by examiner

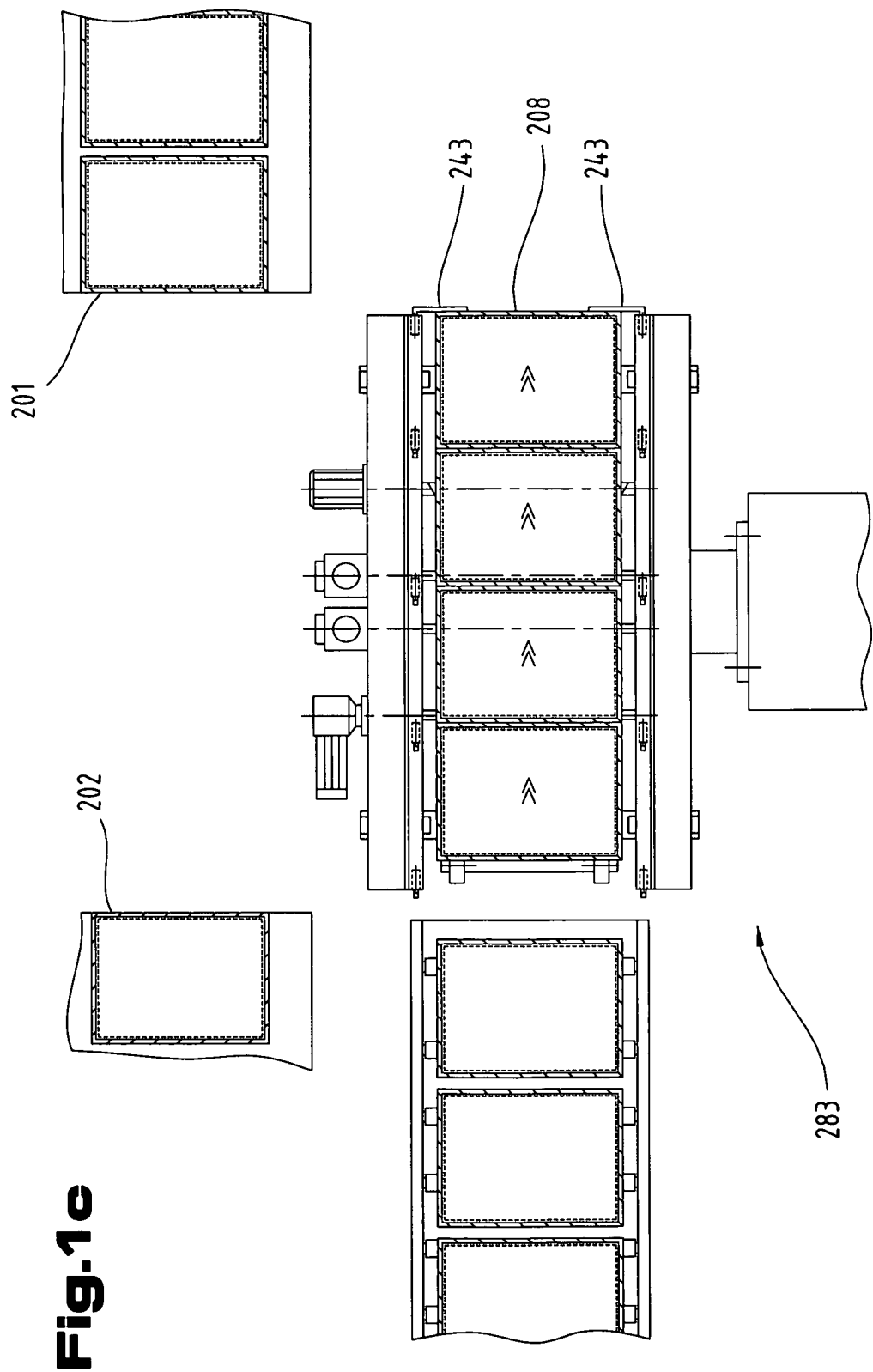

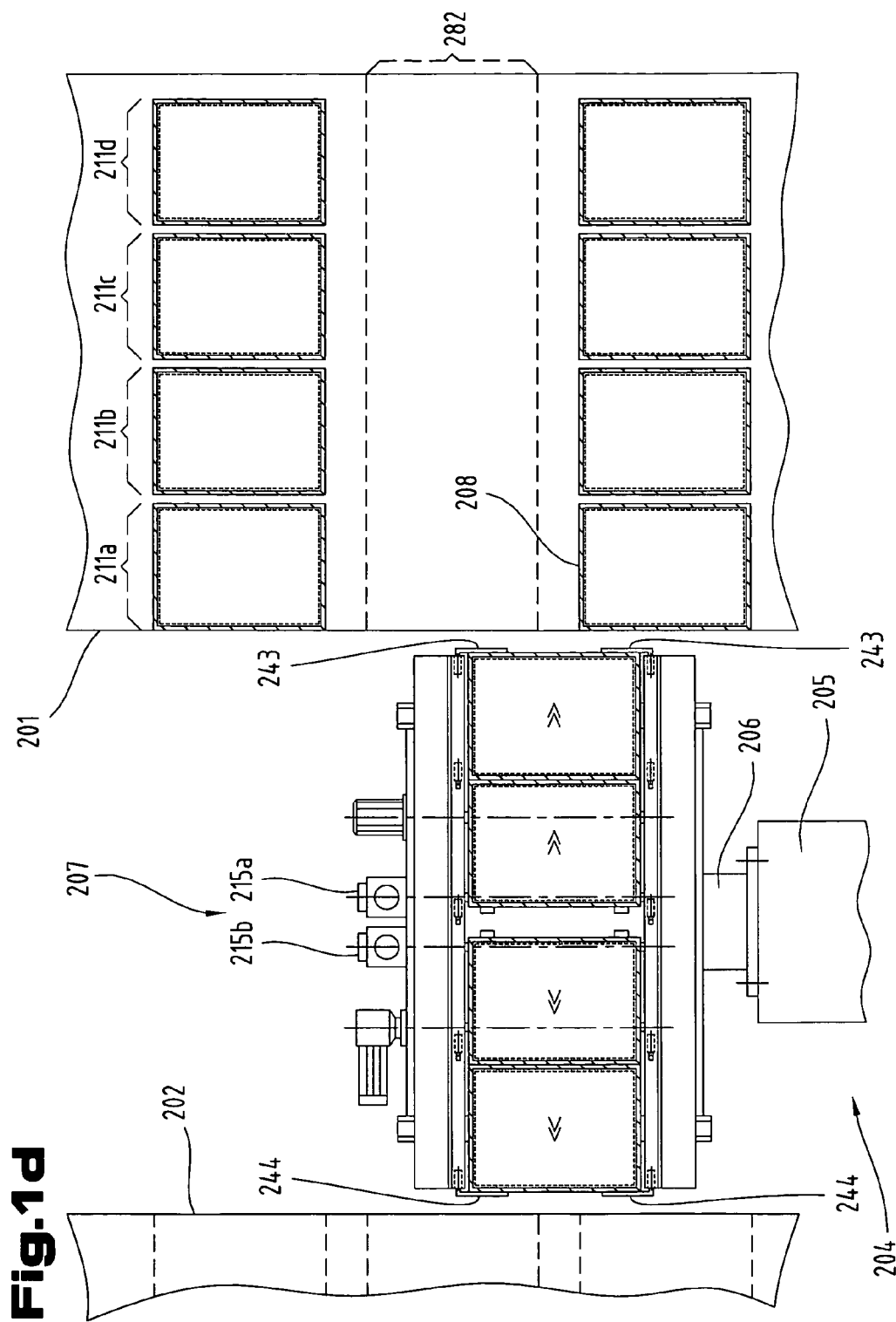

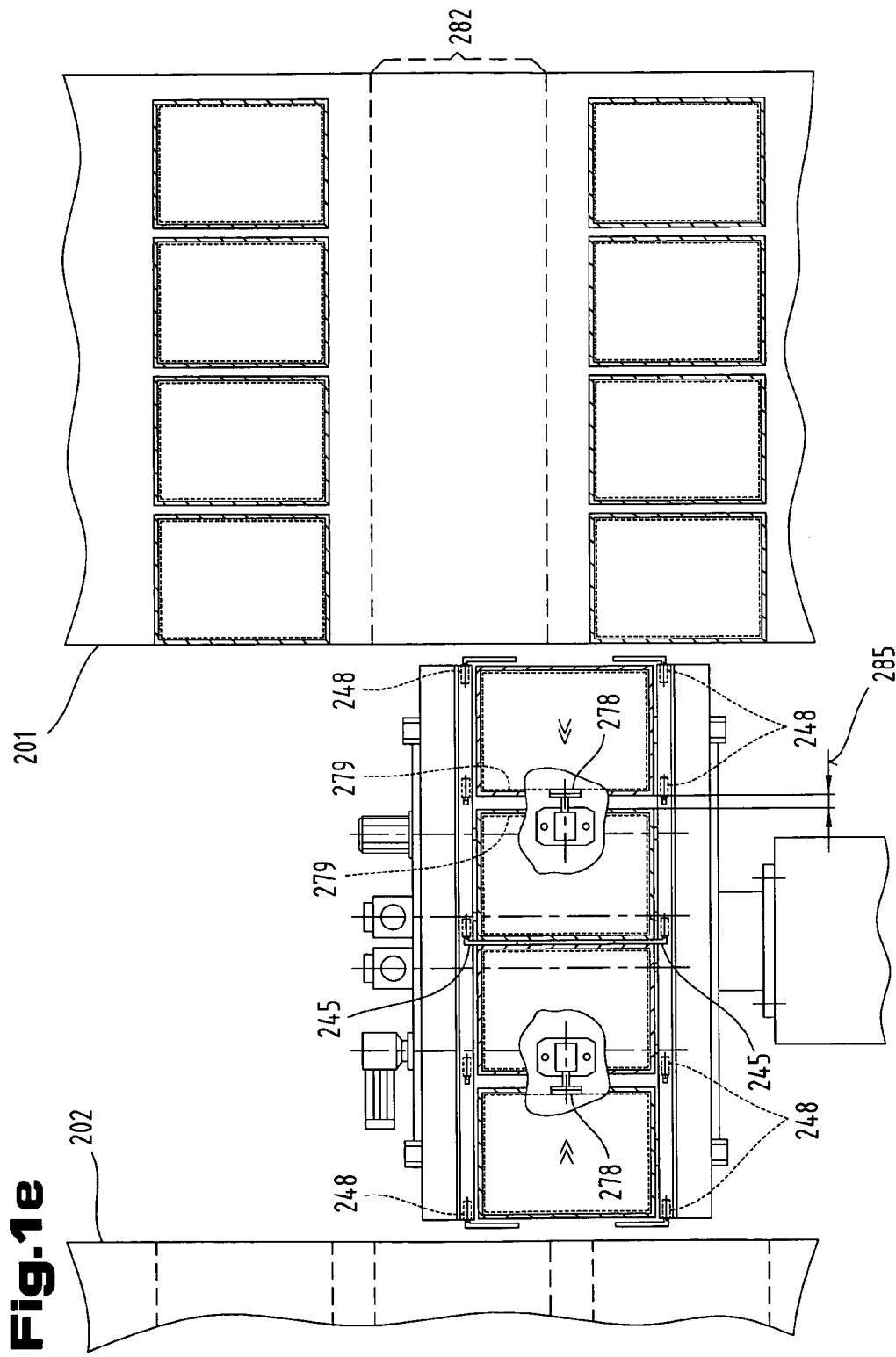

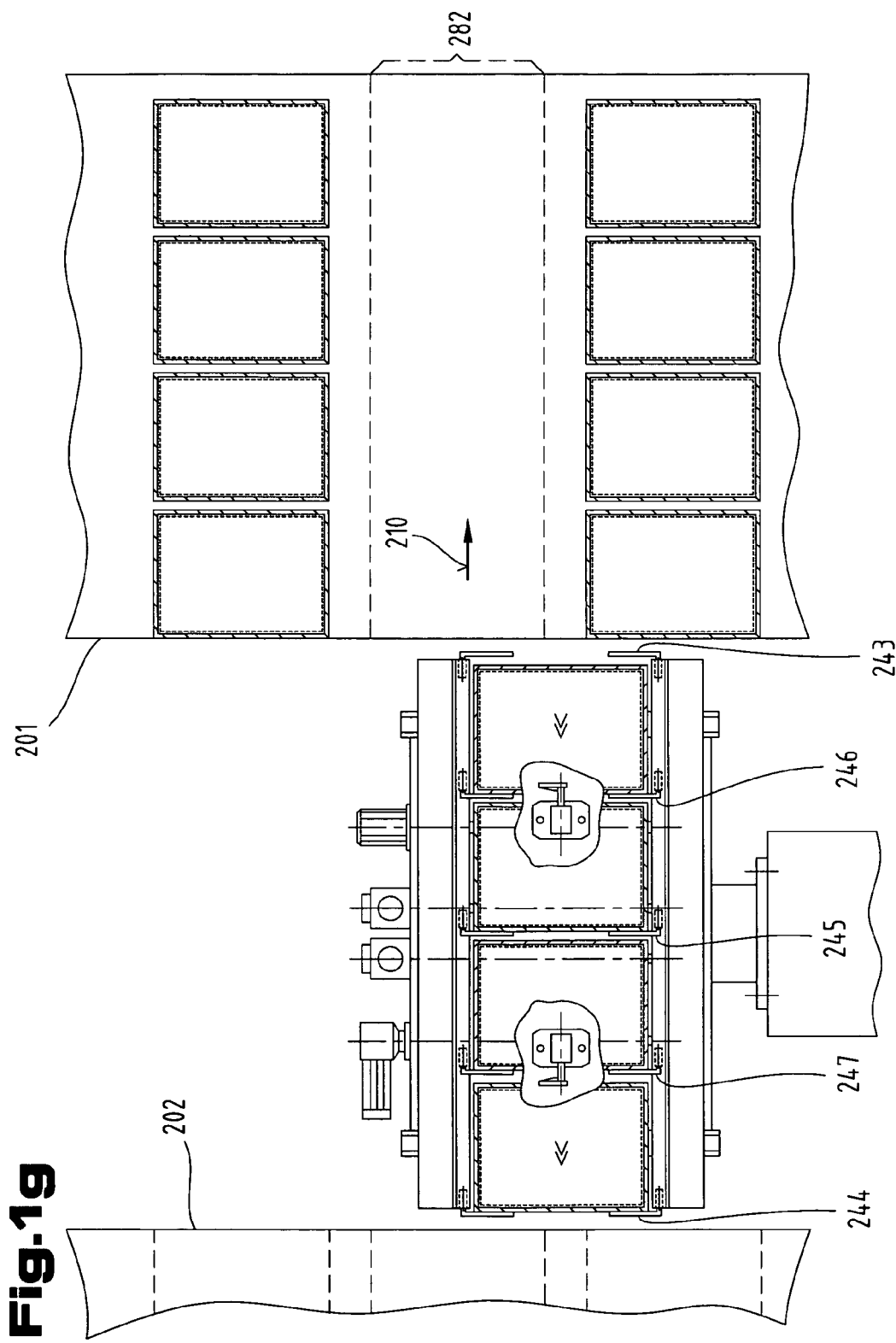

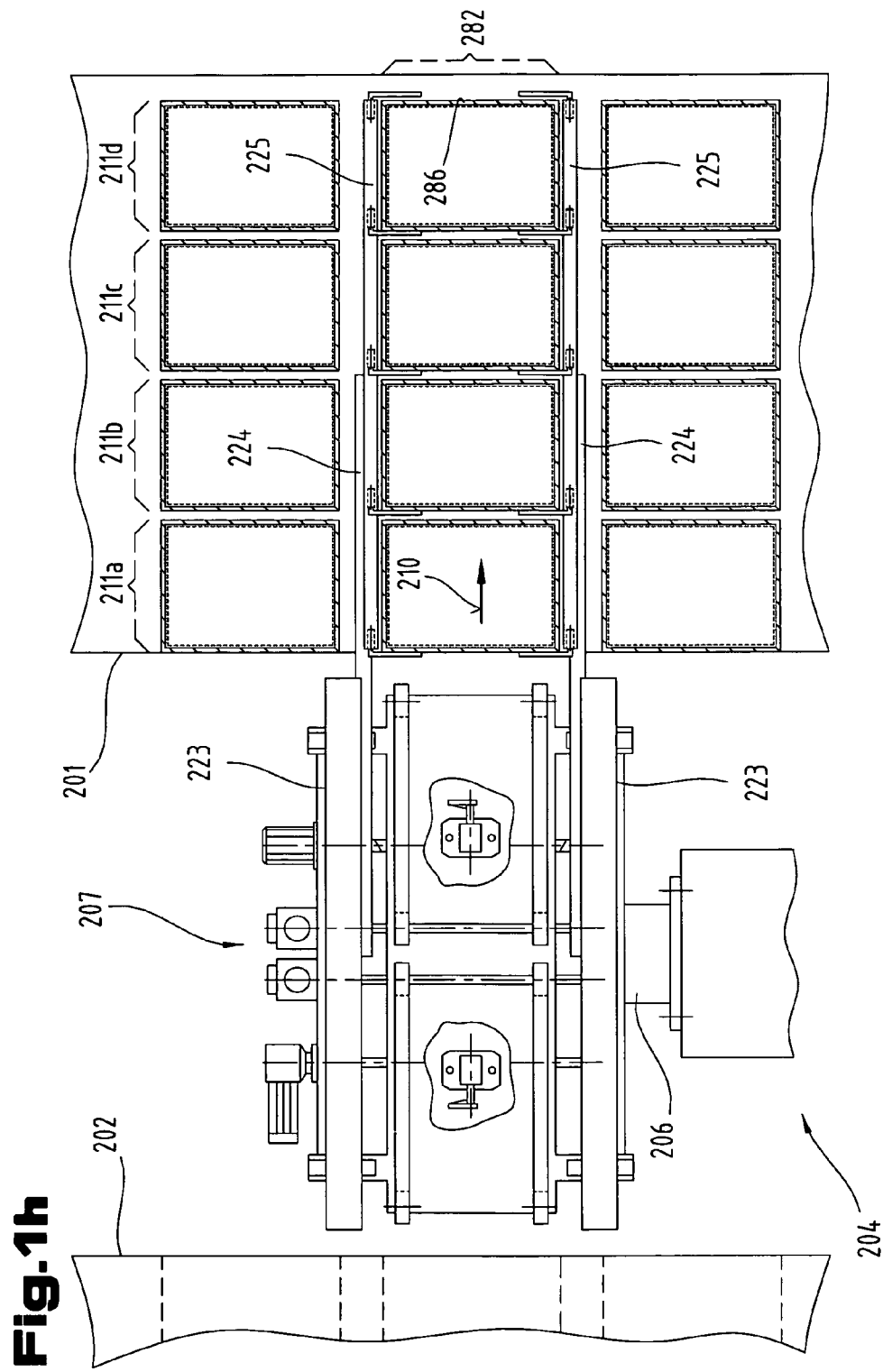

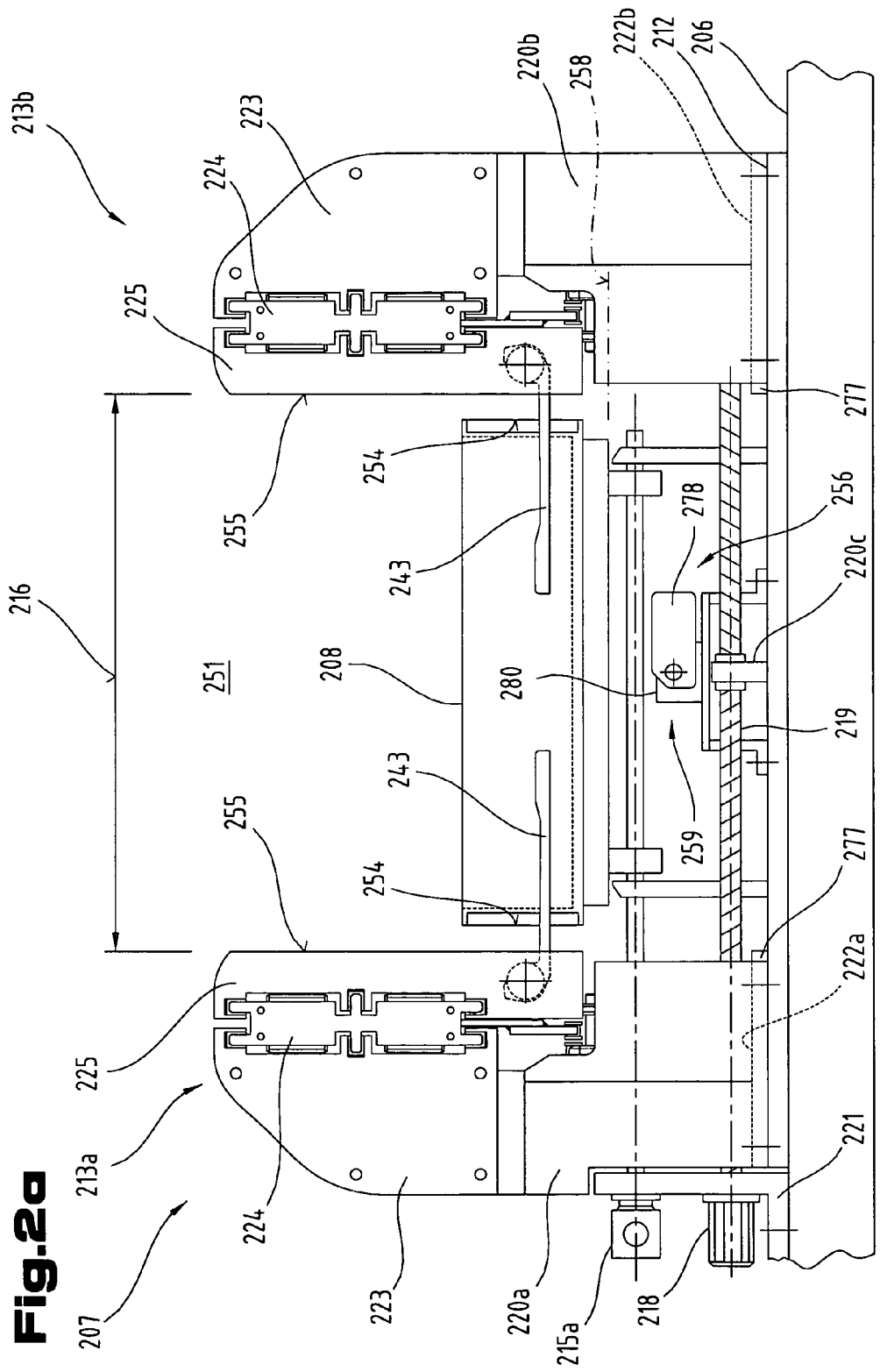

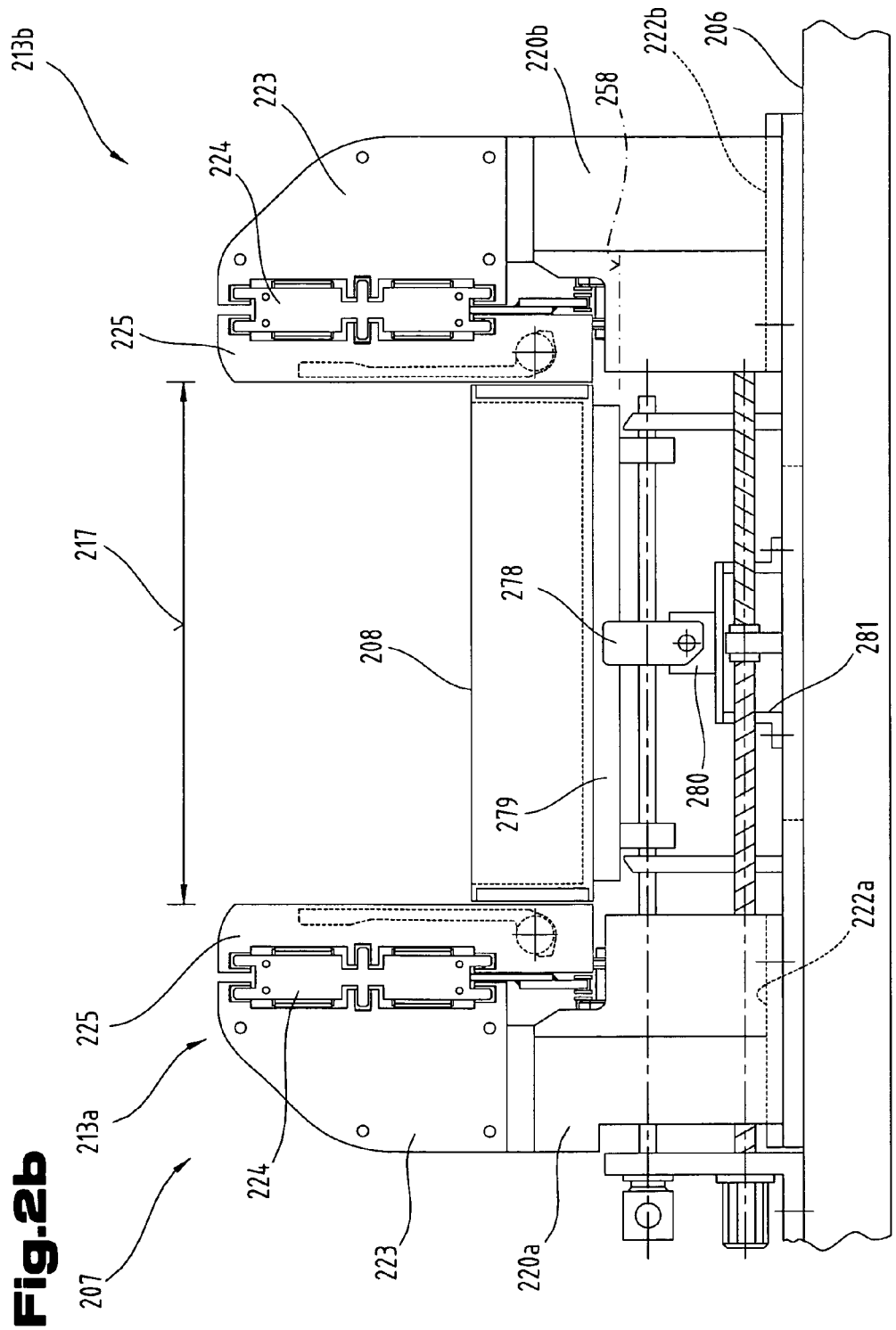

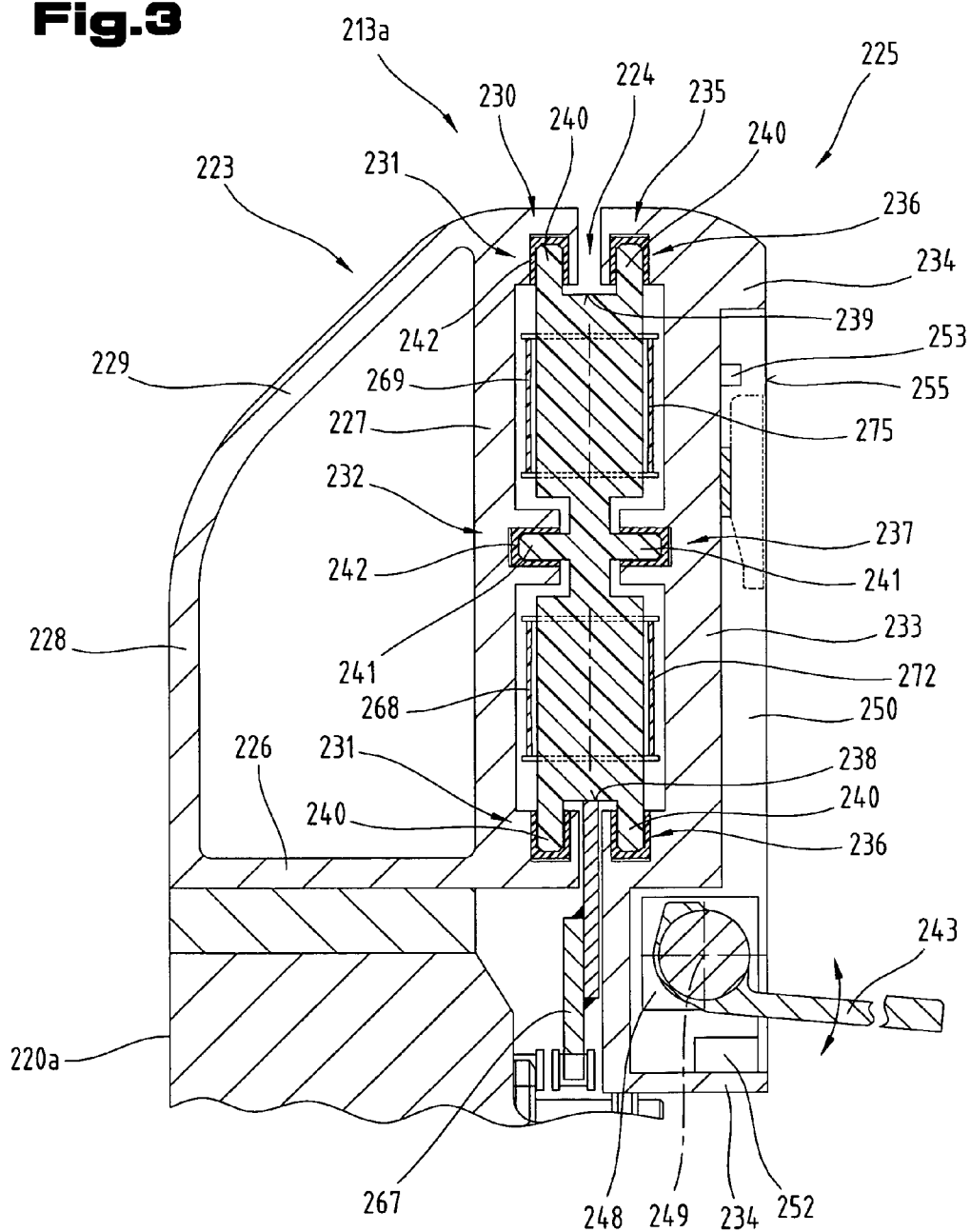

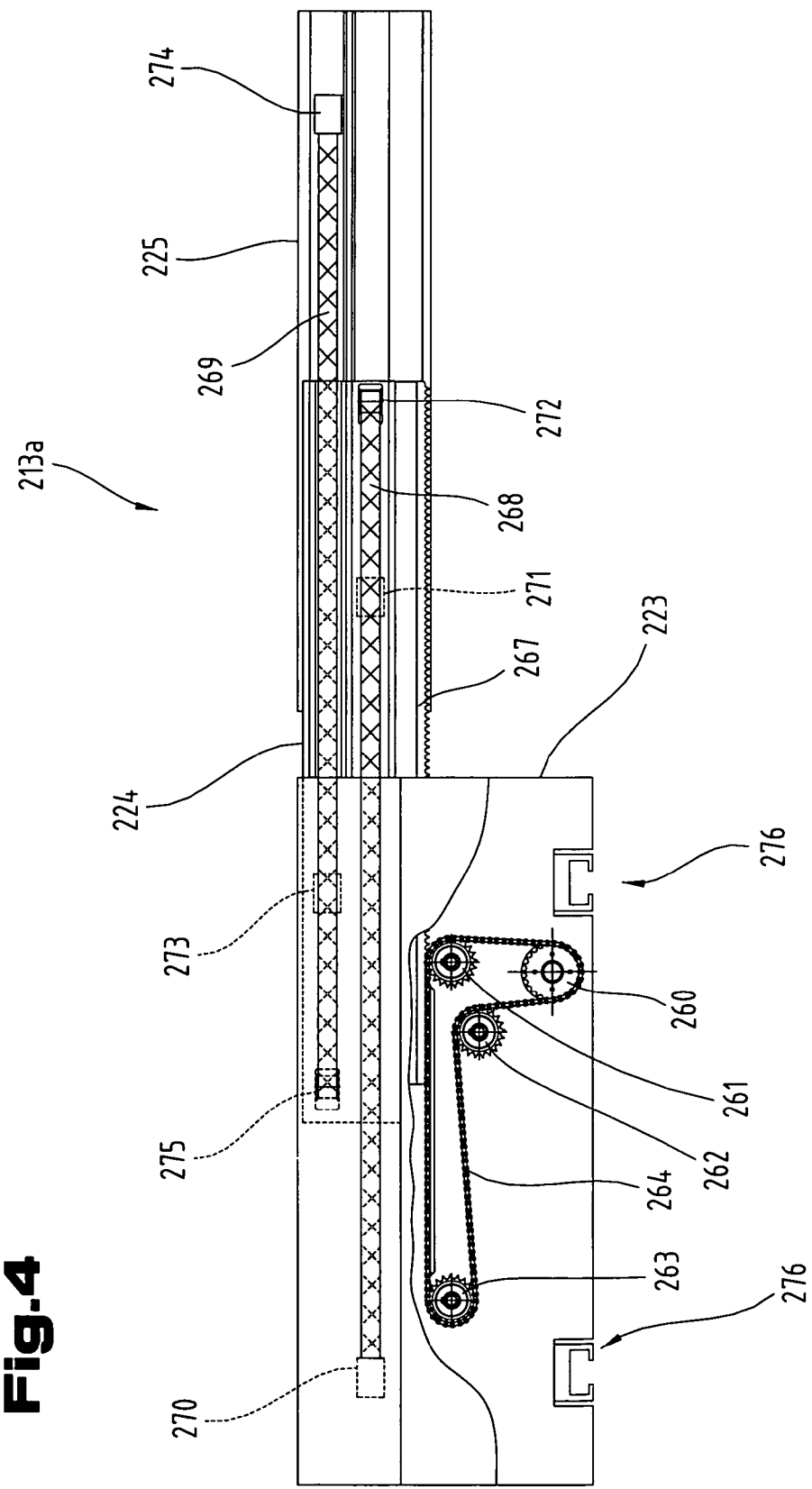

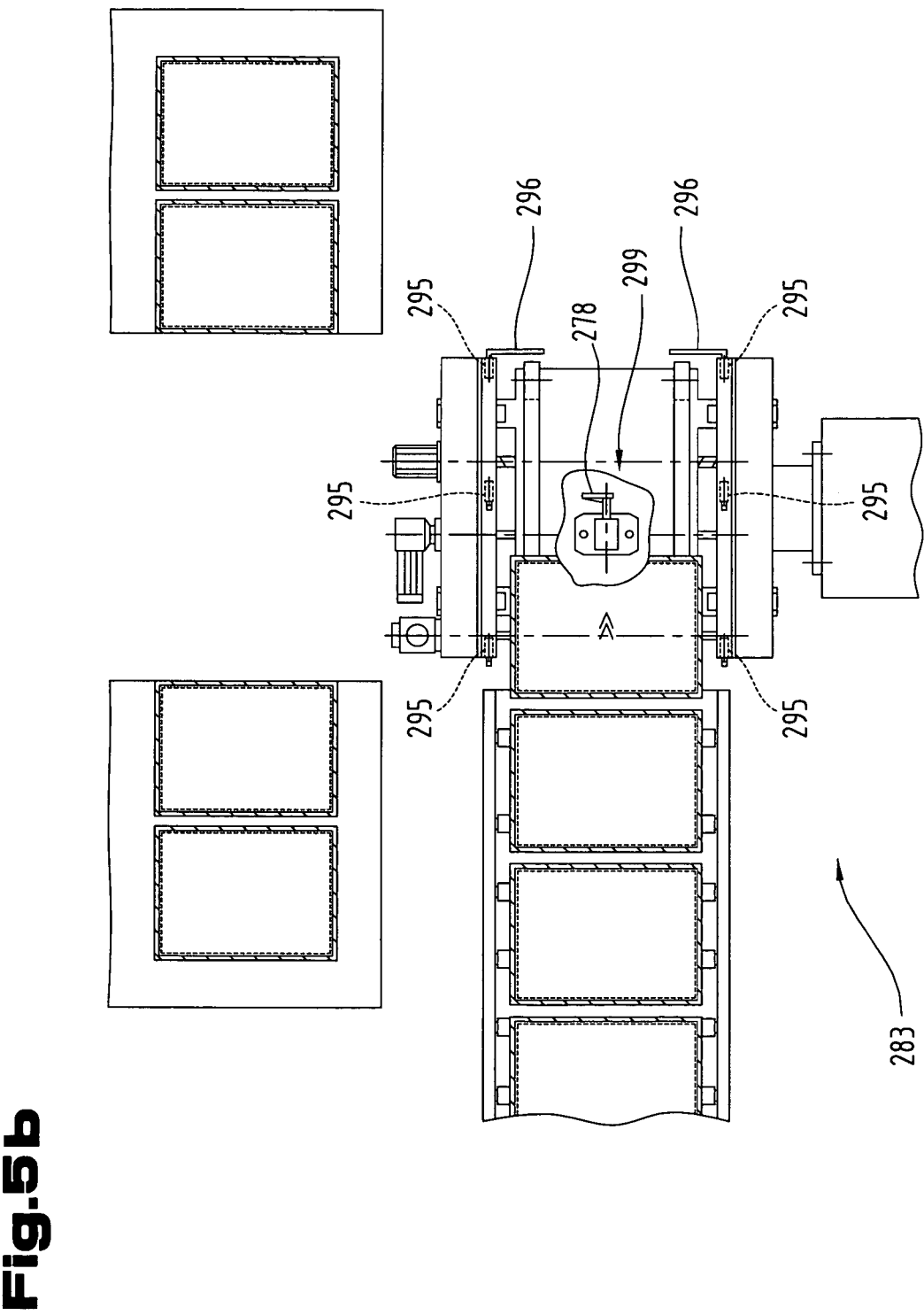

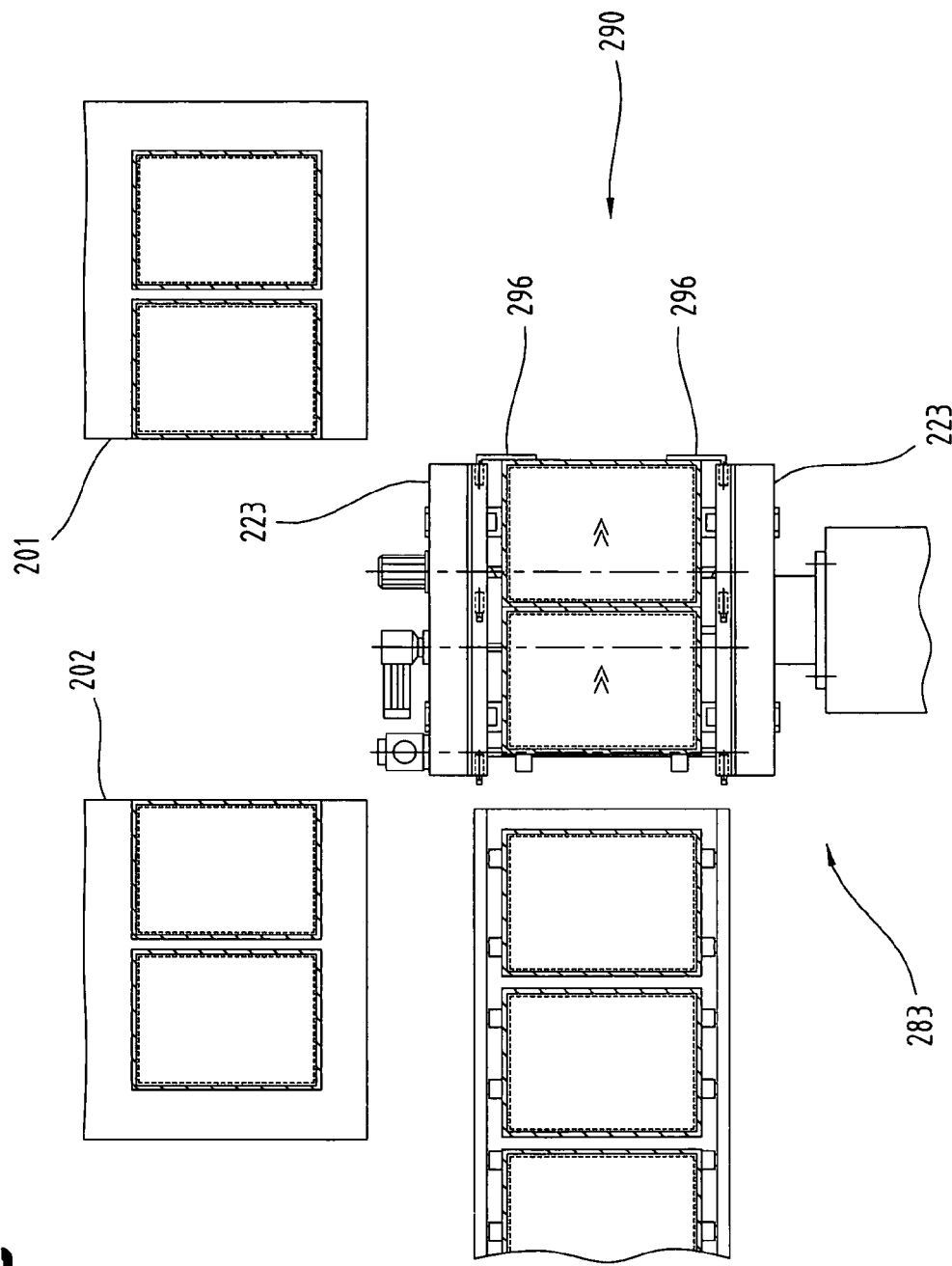

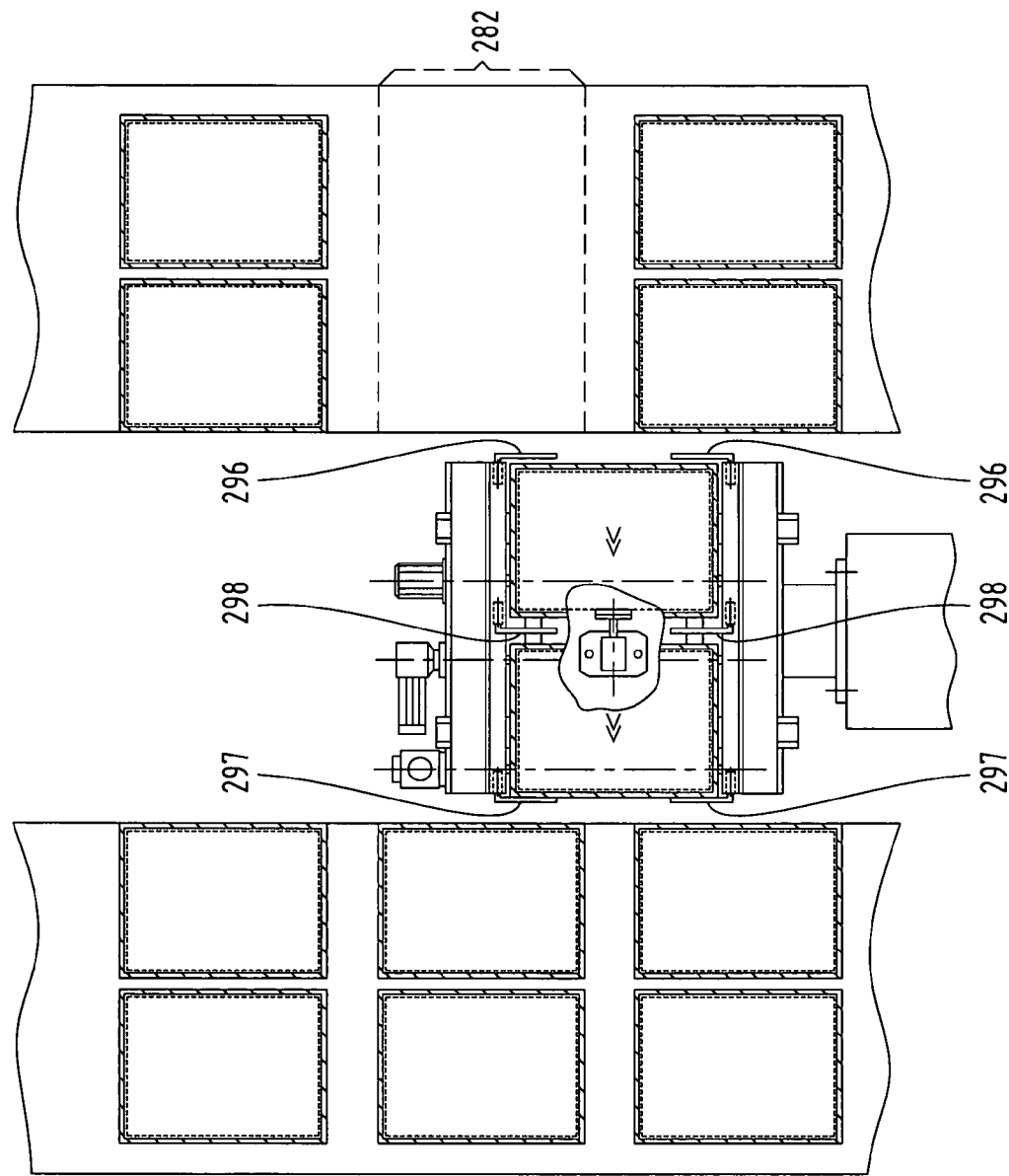

METHOD AND TRANSPORT DEVICE FOR POSITIONING LOADING AIDS PRIOR TO THE TRANSFER THEREOF INTO A SHELF

CROSS REFERENCE TO RELATED APPLICATIONS

This application is the National Stage of PCT/AT2009/000006 filed on Jan. 9, 2009, which claims priority under 35 U.S.C. §119 of Austrian Application No. A 43/2008 filed on Jan. 11, 2008. The international application under PCT article 21(2) was not published in English.

The invention relates to a method for positioning loading aids prior to the transfer thereof into a shelf compartment by means of a transport device and the transport device for performing the method, as described in the preambles of claims 1 and 5.

EP 0 647 575 B1 discloses a transport device for inserting and removing loading aids into or out of a shelf compartment, which comprises at least one telescopic arm consisting of a support frame and a slide mounted displaceably thereon. The slide is provided at the ends with stop devices pivotable between a starting position and an operating position, which can be spaced apart from one another at least so far that a loading aid can be mounted between the latter. If a loading aid is to be inserted into the shelf, at least the stop device mounted at the end opposite the shelf is pivoted behind the side wall of the loading aid and the loading aid is pushed off onto a shelf compartment. During the removal the telescopic arm is moved out into the shelf and then the stop device mounted at the end facing the shelf storage is pivoted behind the side wall of the loading aid and pushed off the shelf compartment. The load bearing device is only suitable for operating a shelf storage system with a single depth shelf row.

In the transport devices known from U.S. Pat. No. 7,128,521 B2 and EP 1 772 400 A1 two loading aids arranged behind one another are undergripped individually by stop devices mounted pivotably on telescopic arms and inserted into the shelf or removed from the shelf.

From EP 0 775 665 B1 a transport device is known in the form of a telescopic table, in which the outer telescopic slide moves up above a loading aid to be inserted or removed and stop pairs are pivoted respectively behind the respective end of the loading aid in opposite directions.

The transport device described in DE 203 03 376 U1 for introducing and removing loading aids comprises a gripping device, which is placed against the side walls of the loading aid to be introduced and removed in a friction-locked manner or for example also by means of suction force on the loading aids. In this way it is possible to prevent the gripping device from moving on removing a loading aid up to the rear wall of the shelf compartment, in order to grip around the rear side wall of the loading aids in a form-fitting manner.

The load mounting device known from DE 44 22 240 A1 comprises parallel arranged telescopic arms each with a slide that can be extended in horizontal direction on both sides, said slides being provided with stop devices. The telescopic arms can be moved towards one another in the direction of a shelf aisle (X-direction) and apart from one another. A continuous conveyor is arranged on the platform between the telescopic arms. To introduce a palette, the latter is moved firstly by means of the continuous conveyor until the stop devices can engage in a form-fitting manner into the palette by the feed movement of the telescopic arms in X-direction. By moving out the slide at the same as the drive of the continuous conveyor the palette is moved into storage space in a shelf compartment that is close to the aisle or remote from the aisle. The palette is gripped laterally either at the front or middle blocks of the palette. On unloading a palette from the shelf compartment firstly the stop devices are adjusted in X-direction and in this way the blocks of the palette are gripped in a form-fitting manner by the stop devices and by drawing in the slide the palette is pushed onto the conveying unit.

The objective of the invention is to provide a method and a transport device for positioning loading aids prior to their transfer into a shelf system with several storage spaces arranged behind one another, by means of which the mode of operation in a storage system can be simplified.

The objective is achieved by way of the measures and features according to the invention. It is an advantage that the loading aids lying closely adjacent to one another are separated by means of a structurally simple separating device before its transfer to a shelf compartment, in particular during the feed movement of the conveying unit to the shelf compartment, on the conveying unit with a mutual spacing, and in this way it is ensured that the stop devices can be adjusted without collision in front of and behind the corresponding loading aids. In this way the loading aids can be stored behind one another with a spacing gap in the shelf compartment in transfer direction, even if the loading aids are stacked closely together on the conveying unit behind the stop device arranged on the insertion side. In this way the advantages of the transport device with stop devices that has already been proven successful in practice can continue to be used and loading aids are introduced and removed singly or several loading aids at a time.

According to the measures in another embodiment the loading aids to be introduced are moved into a defined preparation position and then conveyed to the storage spaces in an exact alignment.

The measure according to another embodiment is also advantageous in which more than two loading aids are positioned before their transfer into a shelf compartment.

Another embodiment is an advantage as the separating device is accommodated in the available free space underneath the conveying plane and this results in a very compact structure of the transport device.

In another development at least one of the telescopic arms necessary for the introduction and removal is equipped with the stop device and can be activated as necessary, in order to perform the introduction and removal process of loading aids into a shelf compartment or out of a shelf compartment.

Another embodiment is also advantageous, as on the one hand loading aids with different dimensions or positional alignments are conveyed between the telescopic arms and on the other hand the loading aids can be aligned prior to their transport on the platform.

Lastly, another embodiment is also advantageous, as several loading aids are conveyed by only one conveying device along the movement path between the telescopic arms and are separated by means of a simple separating device without it being necessary to provide a separate conveying device for each loading aid, which involves not only a complex structure of the transport device but, requires a suitably high number of drive motors for the conveying devices, a complex control system and high energy consumption. By means of the design according to the invention or method a compact transport device is created, which can be produced inexpensively and enables a reliable mode of operation as well as a flexible or appropriate adjustment of power. In addition, the turnover in the storage system can be increased considerably compared to storage systems known from the prior art.

For a better understanding of the invention the latter is explained in more detail with reference to the following Figures.

In a much simplified representation:

FIG. 1*a-g* shows a first embodiment of the transport device and the positioning process of loading aids on the platform of a conveying unit, in several consecutive method steps and in a much simplified view;

FIG. 1*h* shows schematically the introduction process of loading aids from a platform into a shelf compartment;

FIG. 2*a* shows the transport device according to the invention with a moving out unit in its open position, in end view and in a simplified view;

FIG. 2*b* shows the transport device according to the invention with the moving out unit located in its closed position, in end face view and in a simplified view;

FIG. 3 shows a telescopic arm of the moving out unit in an end face view, partly in cross section and in a simplified view;

FIG. 4 shows the telescopic arm according to FIG. 3 in side view and in a simplified representation;

Figure 1A:
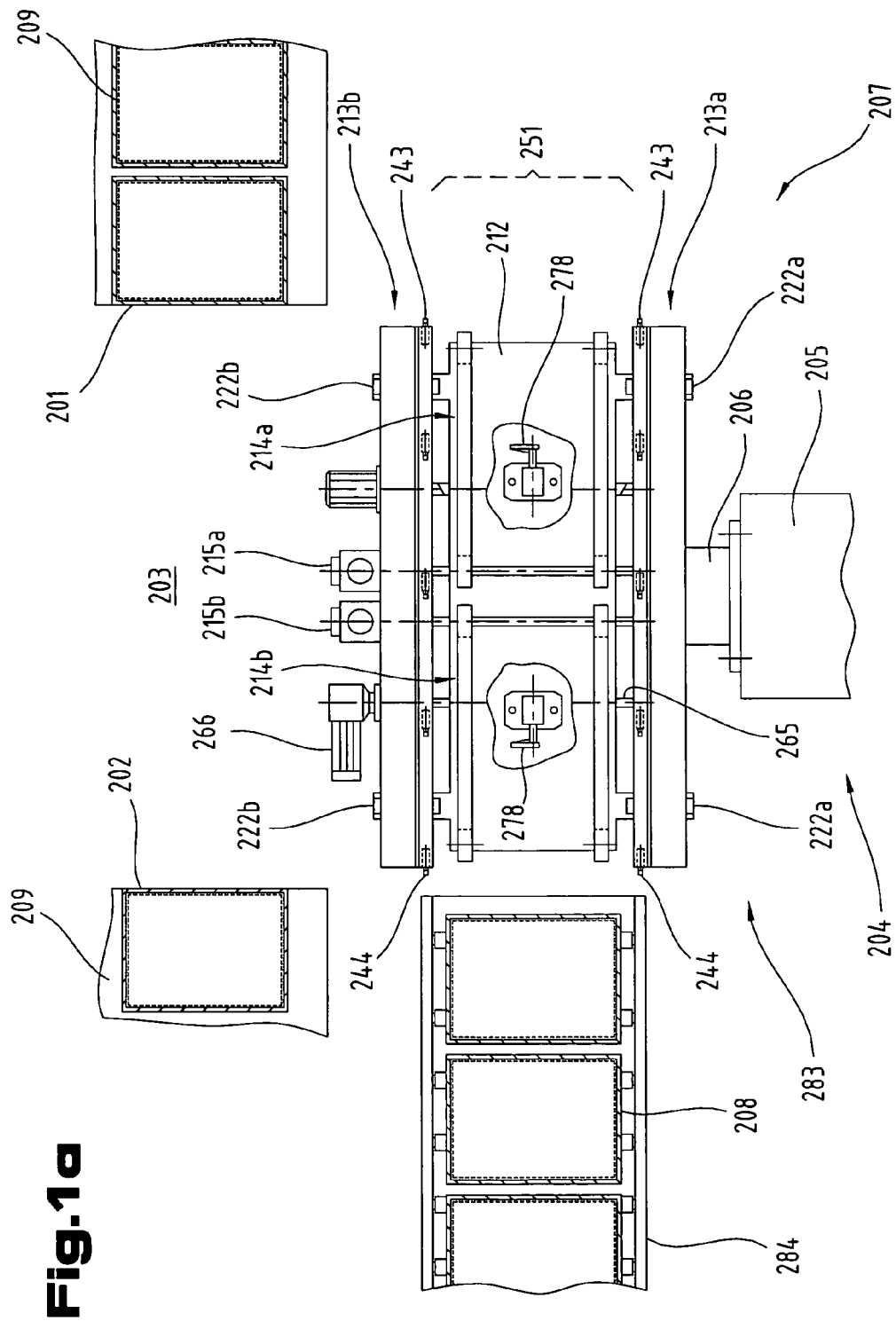

FIG. 5*a-f* shows a further embodiment of the transport device and the positioning process of loading aids on the platform of a conveying unit, in several consecutive method steps and in a much simplified representation.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

In the jointly described FIGS. 1 to 4 a storage system is shown, which comprises spaced apart shelf systems 201, 202 which lie opposite one another in mirror image. By means of the distance between the shelf systems 201, 202 in the storage system an aisle 203 is kept free, in which a conveying unit 204 is arranged. The conveying unit 204 is formed for example by a shelf operating device which can be moved on rails along the aisle 203 and comprises a perpendicular mast 205 secured onto a drive unit (not shown) and a platform 206 which is vertically adjustable along said mast by means of a lifting drive (not shown) as well as a transport device 207 arranged on the latter for introducing and/or removing an individual or simultaneously several loading aids 208 into or out of a shelf compartment 209 of the shelf system 201, 202. The loading aids 208, for example trays, cardboard or plastic containers, are normally filled with goods, but can also be empty.

The shelf systems 201, 202 are formed according to this embodiment by a fixed-rack system which is less expensive than the angled shelves known from the prior art and comprise several shelf compartments 209 arranged spaced apart above one another with storage spaces 211*a* to 211*d* arranged behind one another in several rows in transfer direction 210. According to the shown exemplary embodiment the shelf systems 201, 202 are designed so that in one shelf compartment 209 in transfer direction 210 four loading aids 208 with the dimensions 300 mm×400 mm can be placed. The transport device 207 can also mount four loading aids 208 with the dimensions 300 mm×400 mm behind one another in transverse transport.

The transport device 207 which is adjustable between the shelf systems 201, 202 in front of a shelf compartment 209 determined by the computer system comprises a support plate 212, on which a moving out unit which comprises parallel telescopic arms 213*a*, 213*b* is mounted as well as conveying devices 214*a*, 214*b* arranged behind one another in transfer direction 210. The conveying devices 214*a*, 214*b* are connected to independently controllable drive motors 215*a*, 215*b*, which in turn are connected to the computer system. Preferably, twin track conveyors, in particular belt conveyors are used as the conveying devices 214*a*, 214*b*. On the other hand the conveying devices 214*a*, 214*b* can also be formed by a roller conveyor, belt conveyor or the like.

The telescopic arms 213*a*, 213*b* which can be moved out in both directions relative to the platform 206 into the shelf systems 201, 202 are mounted adjustably on the support plate 212 by means of a first adjusting drive between a moved apart open position 216 shown in FIG. 2*a* and a moved towards one another closed position 217 shown in FIG. 2*b*. The first adjusting drive comprises a servomotor 218 and according to this embodiment a spindle 219 coupled to the latter with opposite running threaded sections and bearing elements 220*a* to 220*c*. The servomotor 218 and the drive motors 215*a*, 215*b* are secured at a securing angle 221 onto the platform 206. The bearing elements 220*a*, 220*b* are connected respectively via guiding arrangements 222*a*, 222*b* to the support plate 212. By rotating the spindle 219 the bearing elements 220*a*, 220*b* are moved towards one another or moved apart from one another and in this case the telescopic arms 213*a*, 213*b* are adjusted relative to a loading aid 208 between its open position 216 and closed position 217 at right angles to the transfer direction 210.

FIG. 3 shows a cross section through a telescopic arm 213*a*. The latter comprises a support frame 223 secured for example by a not shown screw connection onto the bearing element 220*a*, a middle slide 224 displaceable relative to the support frame 223 and an upper slide 225 displaceable relative to the middle slide 224.

The support frame 223 is designed for example as a hollow profile and comprises a lower side wall 226 running parallel to the support plate 212, a projecting first and second side wall 227, 228 and an upper side wall 229 running at an angle between the projecting side walls 227, 228. Between the middle slide 224 and the support frame 223 a guiding arrangement 230 is provided, which according to the shown exemplary embodiment is formed by a sliding guide. The support frame 223 is provided for this on the projecting first side wall 227 facing the middle slide 224 in the region of the longitudinal edges with lateral guiding tracks 231 and between the latter with a height guiding track 232.

The upper slide 225 is designed to be C-shaped in cross section and comprises a base 233 and arms 234 projecting on the latter on the side facing away from the middle slide 224. Between the upper slide 225 and the middle slide 224 a guiding arrangement 235 is provided. The upper slide 225 is provided in addition on the projecting base 233 facing the middle slide 224 in the region of the longitudinal edges with lateral guiding tracks 236 and between the latter with a height guiding track 237.

The plate-like middle slide 224 is provided on the one hand on its lower side 238 and upper side 239 respectively with rib-like guiding webs 240 running parallel in its longitudinal extension and designed to be complementary to the lateral guiding tracks 231, 236 of the support frame 223 and upper slide 225, and on the other hand on its side walls between the lower and upper side 238, 239 is provided with rib-like guiding webs 241 running in its longitudinal extension and designed to be complementary to the height guiding tracks 232, 237 of the support frame 223 and upper slide 225. On the guiding webs 240, 241 of the middle slide 224 sliding strips 242 are fitted.

Of course, instead of the shown sliding guides between the support frame 223 and middle slide 224 on the one hand and the upper slide 225 and middle slide 224 on the other hand a roller guide and the like are arranged.

As shown in an overview of FIGS. 1a to 1h and 3 on the transport device 207, in particular on the upper slide 225 of the telescopic arms 213a, 213b on opposite ends a first and second stop device 243, 244 and between the latter a middle third stop device 245 and between the middle third stop device 245 and the end stop devices 243, 244 respectively a fourth and fifth stop device 246, 247 are arranged. The stop devices 243 to 247 are spaced apart in the longitudinal extension of the upper slide 225 at least so far that between two stop devices 243 to 247 respectively a loading aid 208 can be mounted.

The stop devices 243 to 247 of the two upper slides 225 are arranged opposite one another and are adjustable respectively by means of a fluid or electrically operated servomotor 248 between a starting position shown in FIG. 2b and an operating position shown in FIG. 2a in the direction of the opposite stop device 243 to 247. Preferably, each of the stop devices 243 to 247 of the two upper slides 225 is coupled to a servomotor 248, whereby the servomotors 248 of the stop devices 243 to 247 arranged opposite one another are controlled almost synchronously.

According to the shown exemplary embodiment the stop devices 243 to 247 are formed by flaps mounted on the upper slide 225 to be pivotable about axes 249 parallel to the transfer direction 210 between the starting and operating position.

In the starting position the stop device 243 to 247 is moved into a recess 250 between the arms 234 of the upper slide 225, therefore the stop device 243 to 247 is moved out of a movement path 251 of the loading aids 208 between the conveying unit 204 and the shelf compartment 209. However, in the operating position the stop device 243 to 247 is moved out of the recess 250, therefore the stop device 243 to 247 is moved into the movement path 251 of the loading aids 208 between the conveying unit 204 and the shelf compartment 209 and projects above the outer boundary of the upper slide 225.

As also shown in FIG. 3, the starting and operating position of the stop device 243 to 247 is monitored by sensors 252, 253.

The transport device 207 or moving out unit also comprises an alignment device for loading aids 208 provided on the conveying device 214a, 214b, which according to this exemplary embodiment is formed by the telescopic arms 213a, 213b to be moved opposite one another into a closed position 217 and in an alignment or centering position comprises relatively adjustable planar alignment faces 255 placed against the parallel side walls 254 in transfer direction 210. Preferably, the opposite alignment faces 255 are moved towards one another into the alignment position, so that a loading aid 208 is positioned on the conveying device 214a, 214b centrally between the telescopic arms 213a, 213b, before it is pushed off into the shelf compartment 209. On the other hand only one of the telescopic arms 213a, 213b is adjusted in the direction of the opposite, fixed telescopic arm 213a, 213b.

The telescopic arms 213a, 213b can be extended telescopically in both directions by means of a second actuator in relation to the platform 206, as explained with reference to FIGS. 3 and 4.

On each support frames 223 of the telescopic arms 213a, 213b a pulley drive is arranged respectively, which comprises a drive wheel 260, guiding wheels 261, 262, a click wheel 263 and a continuous pulling means 264 guided around the latter, for example a chain. The drive wheels 260 are connected together via a drive shaft 265 (FIG. 1a) and coupled to a drive motor 266.

On each middle slide 224 a drive member 267, for example a gear rack is secured, which engages in the upper strand of the puling means 264. In this way on the rotation of the drive wheels 260 the middle slides 224 are loaded via the pulling means 264 and drive elements 267 with a driving force and with respect to the support frame 223 are displaced synchronously, i.e. moved in or out.

In order at the same time to move the upper slides 225 relative to the middle slide 224 the upper slides 225 are preferably connected via two pulling means 268, 269, in particular belts, to the support frame 223.

The first pulling means 268 is secured at its first end by means of a clamp 270 onto the opposite end section of the support frame 223 in the moving out direction of the telescopic arm 213a, 213b and at its second end by means of a clamp 271 onto the opposite end section of the upper slide 225 in the moving out direction of the telescopic arm 213a, 213b and is guided about a roller 272 mounted in the moving out direction of the telescopic arm 213a, 213b in the front end section of the middle slide 224.

The second pulling means 269 is secured at its first end by means of clamp 273 onto a front end section of the support frame 223 in the moving out direction of the telescopic arm 213a, 213b and at its second end by means of a clamp 274 onto the front end section of the upper slide 225 in the moving out direction of the telescopic arm 213a, 213b and is guided about a roller 275 mounted in the moving out direction of the telescopic arm 213a, 213b in the opposite end section of the middle slide 224.

Depending on the rotational direction of the drive motor 266 the telescopic arms 213a, 213b can be moved in and out synchronously, in order to insert loading aids 208 into a shelf compartment 209 of the shelf system 201 on the right side of the aisle 203 or the shelf system 202 on the left side of the aisle 203 or to remove them from a shelf compartment 209 of the shelf system 201 on the right side of the aisle 203 or a shelf system 202 set up on the right side of the aisle 203.

As shown in FIG. 4 the support frame 223 is provided with guiding elements 276, which are designed to be complementary to guiding elements 277 secured to the support frame 206 (FIG. 2a, 2b).

The transport device 207 also comprises between the first and third stop devices 243, 245 and the second and third stop devices 244, 245 a separating device 256, 257. The separating device 256, 257 is preferably arranged underneath the conveying plane 258 and comprises a retaining element 278 adjustable via an adjusting drive 259 between a basic position shown in FIG. 2a and a separating position shown in FIG. 2b. In the basic position the retaining element 278 is lowered below the conveying plane 258 whilst in the separating position the retaining element 278 projects on the conveying plane 258 and engages in a stacking edge 279 of the loading aid 208. The adjusting drive 259 comprises a fluid or electrically operated servomotor 280, which is secured by means of a holding frame 281 on the support plate 212.

Figure 1B:
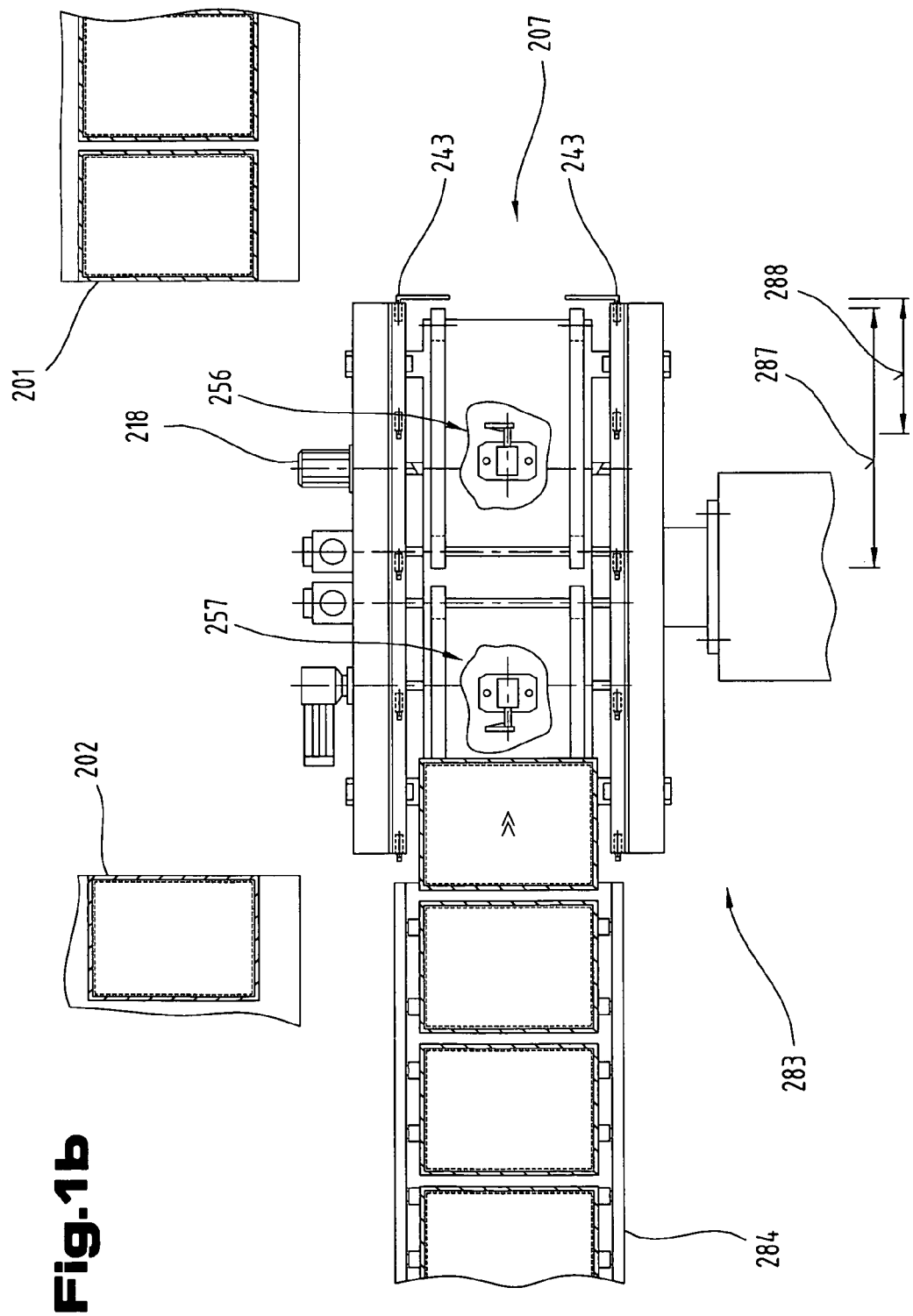

As shown in FIG. 1b, it is an advantage if a length 287 of the conveying device 214a, 214b is greater than a longitudinal distance 288 between the first/second and fourth/fifth stop devices 243, 244, 246, 247. Preferably, the conveying device 214a, 214b extends over a length 287, which corresponds to a multiple of the longitudinal spacing 288, so that on the conveying plane 258 designed by each conveying device 214a, 214b two loading aids 208 can be mounted behind one another and both loading aids 208 are charged by the same conveying device 214a, 214b with an advancing or driving force for positioning the loading aids 208. The separating device 256, 257 is arranged between the ends of the conveying device 214a, 214b.

In the following with reference to FIGS. 1a to 1g the method is described for positioning loading aids 208 prior to their transfer by the transport device 207 from the conveying unit 204 into a shelf compartment 209 of the shelf systems 1, 2.

Before the transport device 207 moves into the storage position in front of a storage channel 282 defined by the computer system, in a prezone 283 of the storage system shown in FIGS. 1a to 1c if necessary according to the picking orders loading aids 208 are transported up by at least one conveying device 284 and taken by the transport device 207. The conveying device 284 is formed for example by a roller conveyor.

Before moving the loading aids 208—for example four loading aids 208 with dimensions 300 mm×400 mm—from the conveying device 284 onto the transport device 207 it has to be ensured that with the exception of the pair of stop devices 243 facing away from the conveying device 284 all of the stop devices 244 to 247 are moved into the starting position and the telescopic arms 213a, 213b into their open position 216. The pair of stop devices 243 opposite the takeover side of the loading aids 208 is moved into the operating position, thus into the movement path 251 of the loading aids 208, as shown in FIGS. 1b and 1c. The conveying device 284 of the prezone 283 and the conveying devices 214a, 214b of the transport device 207 are driven for the shifting movement of the loading aids 208 onto the transport device 207 at almost uniform conveying speed.

The loading aids 208 are then conveyed on the transport device 207 by means of the conveying devices 214a, 214b along the movement path 251 and the first loading aid 208 taken by the transport device 207 is positioned against the stop devices 243 arranged on the insertion side and the following loading aids 208 are placed behind the first loading aid 208, as shown in FIG. 1c.

Once the loading aids 208 are placed on the transport device 207, the transport device 207 is moved by means of the conveying unit 204 out of the prezone 283 into the storage position in front of the storage channel 282 determined by the computer system. During the adjusting movement of the transport device 207 the loading aids 208 are positioned on the platform 206, as described with reference to FIGS. 1d to 1g.

The loading aids 208 have to be positioned before their transfer into the storage channel 282 of the shelf compartment 209 on the conveying unit 204. For this firstly the second stop devices 244 are moved out of their starting position into the operating position and the loading aids 208 are moved apart separately into groups by means of the conveying devices 214a, 214b driven in the opposite conveying direction and positioned against the stop devices 243, 244 adjusted to the movement path 251, as shown in FIG. 1d and indicated by the arrows. If the loading aids 208 stop against the stop devices 243, 244, by means of not shown sensors, for example light barriers, the presence of the loading aids 208 is determined and the conveying devices 214a, 214b are controlled and stopped by the computer system.

Then the middle third stop devices 245 are moved out of their starting position into the operating position and the retaining element 278 of the separating devices is moved into the separating position (FIGS. 1d and 2b) between the closely adjacent loading aids 208, in particular between the stacking edges 279 of the loading aids 208, whereupon the conveying devices 214a, 214b are driven in opposite directions, as indicated in FIG. 1e by the arrows, and the front and rearmost loading aid 208 in transfer direction 210 or the loading aids 208 positioned against the end side stop devices 243, 244 are moved towards one another. In this case the loading aids 208 run respectively with their stacking edge 279 against the retaining element 278 of the separating devices 256, 257, as shown in FIG. 1e. At the same time also the inner loading aids 208 located between the outer loading aids 208 are moved towards one another and positioned against the middle third stop devices 245 moved into the operating position, as also shown in FIG. 1e. If the inner loading aids 208 are moved against the stop devices 245, by means of not shown sensors, for example light barriers, the presence of the inner loading aids 208 is detected and the conveying devices 214a, 214b are controlled and stopped by the computer system.

Figure 1F:
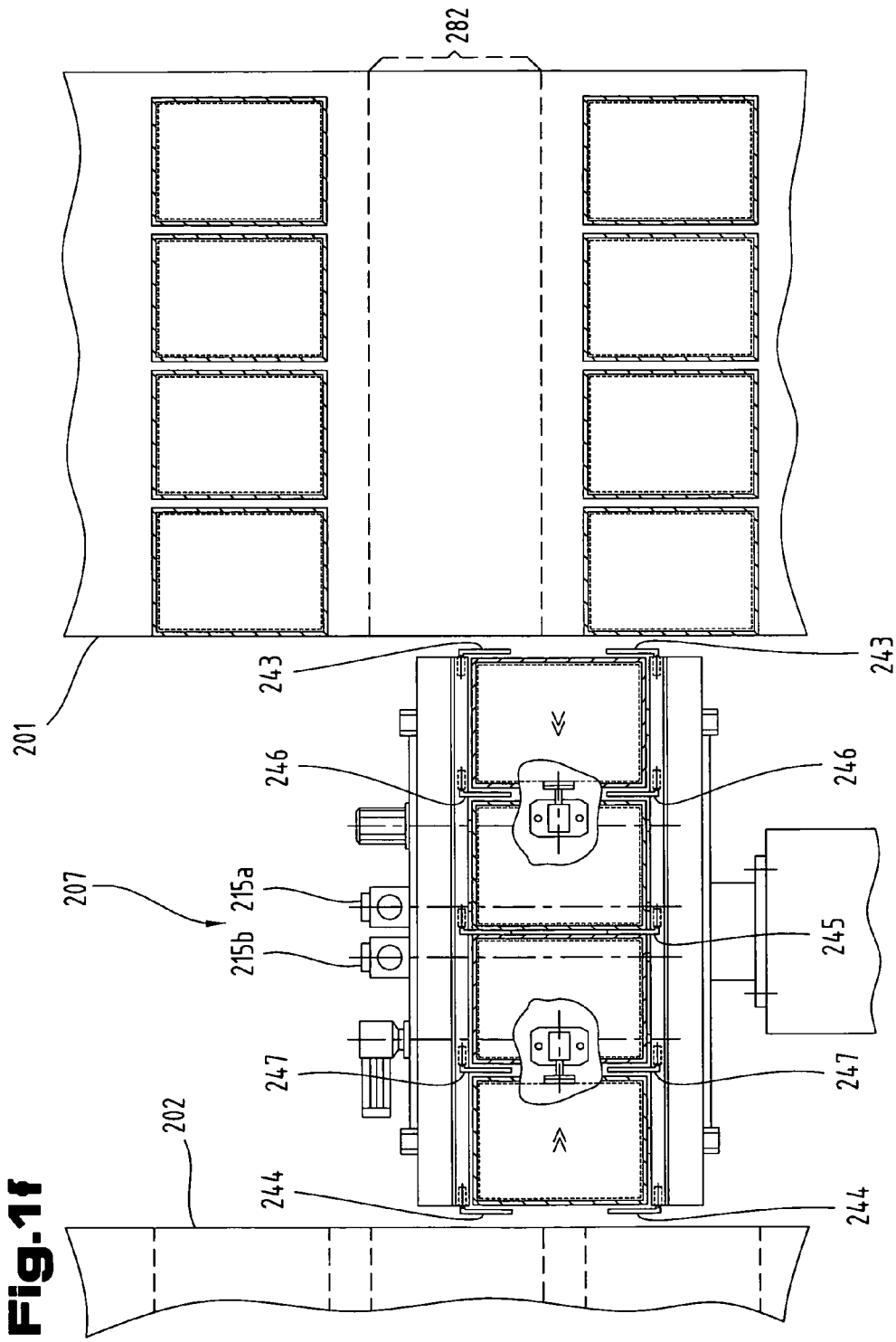

In this way between the outer and inner loading aids 208 a spacing gap 285 is formed which makes it possible for the fourth and fifth stop devices 246, 247 to be moved out of their starting position into the operating position shown in FIG. 1f.

Afterwards the retaining elements 278 are moved out of their separating position into the basic position (FIGS. 1g and 2a) lowered in relation to the conveying plane 258, so that the loading aids 208 can be conveyed by means of the conveying devices 214a, 214b between the stop devices 243 to 247 along the movement path 251. As shown in FIG. 1g, the loading aids 208 are preferably driven before their transfer into the storage channel 282 by the equidirectional drive of the conveying devices 214a, 214b in a direction opposite the transfer direction 210 and all of the loading aids 208 are positioned against the stop devices 244 to 246. If all of the loading aids 208 are stopped against the stop devices 244 to 247, by means of the sensors the presence of the inner and outer loading aids 208 is determined and the conveying devices 214a, 214b are stopped.

Once the storage position has been reached, the transport device 207 is moved so far that its conveying plane 258 formed by the conveying devices 14a, 14b—as indicated in FIGS. 2a and 2b—and a storage surface of the shelf compartment 209 are almost in alignment and the transport device 207 is positioned centrally to the storage spaces 211a to 211d of the storage channel 282 lying behind one another.

To insert the loading aids 208 into the storage channel 282 the telescopic arms 213a, 213b are moved out synchronously and the loading aids 208 are pushed into the storage channel 282 onto the storage spaces 211a to 211d, as shown in FIG. 1h. At the same time the conveying devices 214a, 214b are driven in the transfer direction 210. The conveying speed of the conveying devices 214a, 214b corresponds approximately to the moving out speed of the telescopic arms 213a, 213b.

Afterwards the telescopic arms 213a, 213b are moved out of their closed position 217 into their open position 216 and the stop devices 243 to 247 are moved out of their operating position into the starting position relative to the loading aids 208, so that the loading aids 208 are released and the telescopic arms 213a, 213b can retract again.

When unloading the loading aids 208 from the shelf compartment 209 the telescopic arms 213a, 213b are moved into the open position 216 and extended. Then the telescopic arms 213a, 213b are moved back into their closed position 217 and the stop devices 243 to 247 out of their starting position into the operating position, in which the stop devices 243, 245 to 247 are located behind the rear wall 286 of the stored loading aids 208. Then the telescopic arms 213a, 213b are driven up to the platform 206 and the loading aids 208 are pushed onto the conveying plane 258 of the transport device 207. At the same time as retracting the telescopic arms 213a, 213b the conveying devices 214a, 214b are driven opposite the transfer direction 210. The conveying speed of the conveying devices 214a, 214b corresponds approximately to the moving in speed of the telescopic arms 213a, 213b.

FIGS. 5a to 5f show a further embodiment of the transport device 290 for inserting and removing loading aids 208 into or out of a shelf compartment 209 of the shelf systems 201, 202 set up on both sides, which comprises a support plate 291, on which a moving out unit comprising parallel telescopic arms 292a, 292b is arranged and between the latter a conveying device 293, for example a twin track conveyor is mounted. The conveying device 293 is connected to a drive motor 294. In a storage channel 282 of a shelf compartment 209 in the transfer direction 210 behind one another two loading aids 208 can be placed, for example with the dimensions 300 mm×400 mm. The transport device 290 can also mount two loading aids 208 behind one another in transverse transport.

Figure 5A:
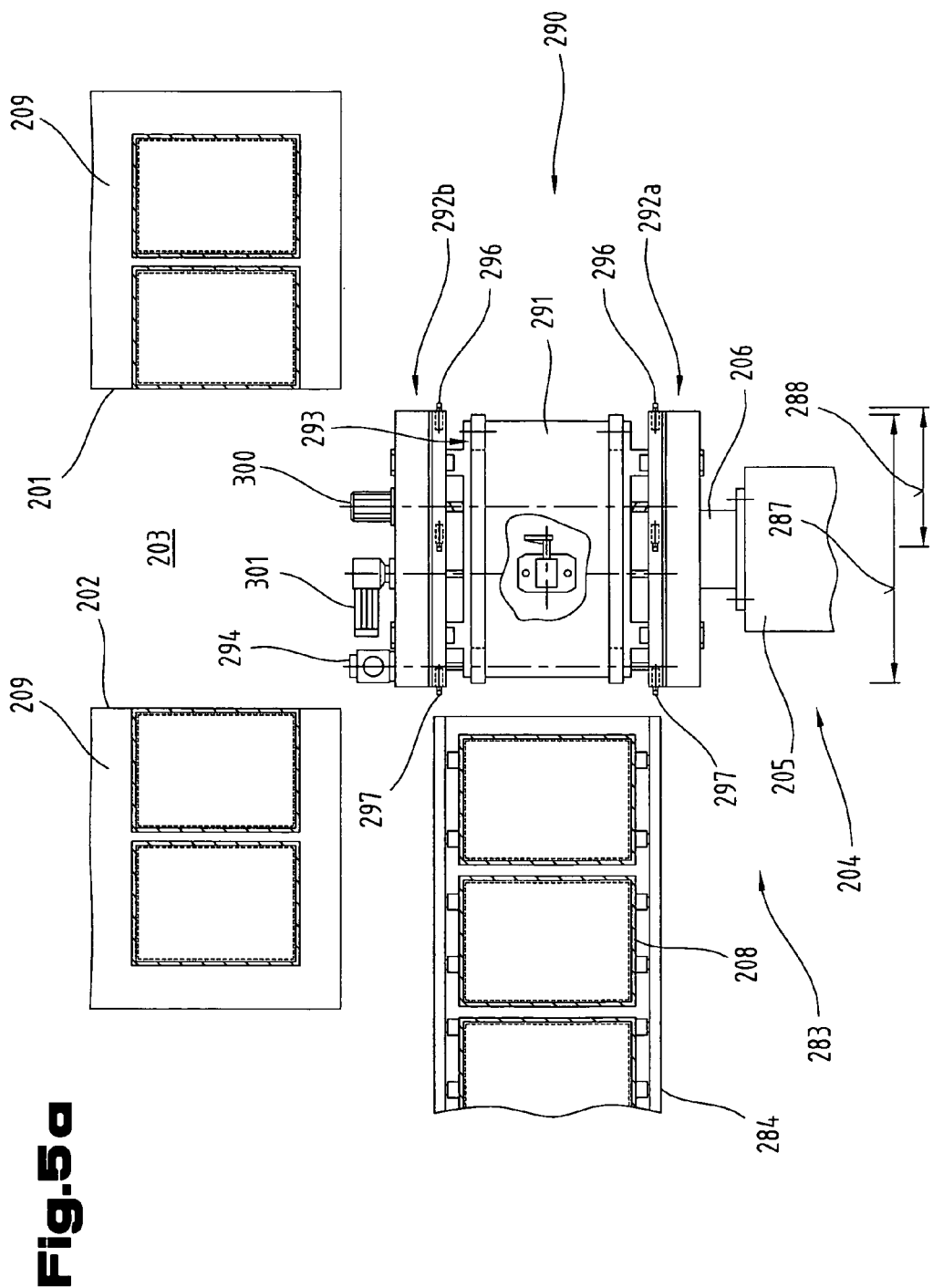

As indicated in FIG. 5a, the length 287 of the conveying device 293 is greater than a longitudinal spacing 288 between the first/second and third stop devices 296, 297, 298. Preferably, the conveying device 293 extends over a length 287, which corresponds to a multiple of the longitudinal spacing 288, so that the conveying plane 258 forming the conveying device 293 can mount two loading aids 208 and both loading aids 208 can be charged with the same feed or driving force for positioning the loading aids 208. The separating device 299 is arranged between the ends of the conveying device 293.

The telescopic arms 292a, 292b of the moving out unit are mounted adjustably on the support plate 291 via a servomotor 300 of a first adjusting drive between a moved apart open position 216 and a moved together closed position 217 and can be moved out telescopically in both directions via a drive motor 301 of a second adjusting drive in relation to the platform 206, as described above. The structure of the telescopic arms 213a, 213b corresponds to the one described above and the latter comprise the support frame 223, middle and upper slide 224, 225.

The transport device 290 or the telescopic arms 292a, 292b of the moving out unit comprise in addition independently controllable servomotors 295 between the stop devices 296 to 298 which can be moved between the aforementioned starting position and operation position. The upper slides 225 of the telescopic arms 292a, 292b are provided respectively at opposite ends with a first and second stop device 296, 297 and between the latter with a middle third stop device 298.

In addition, between the first and second stop device 296, 297 the transport device 290 comprises a separating device 299, which comprises the aforementioned, adjustable retaining element 278.

The loading aids 208 are conveyed in turn by a conveying device 284 into the prezone 283 and taken over by the transport device 290 and stacked against the stop devices 296 opposite the transfer side, as shown in FIGS. 5b and 5c. The conveying device 284 of the prezone 283 and the conveying device 293 of the transport device 290 are driven for the displacement movement of the loading aids 208 onto the transport device 290 at almost the same conveying speed.

Figure 5D:
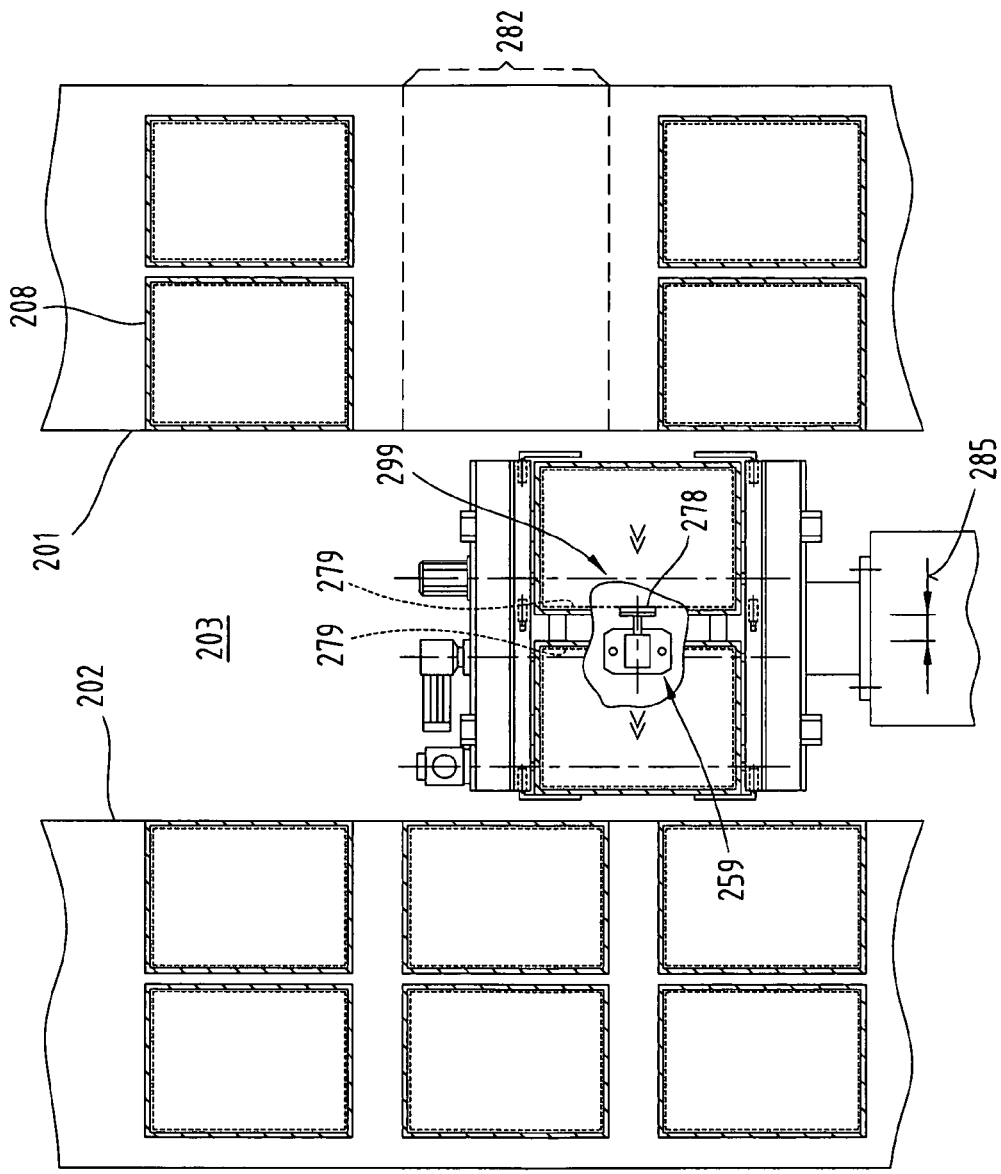

If the loading aids 208 have been positioned against the stop devices 296, the stop devices 297 are moved on the takeover side into the operating position and the conveying device 293 is driven against the transfer direction 210 and in this way the front loading aid 208 in transfer direction 210 is held back at the retaining element 278 moved previously into the separating position, whereas the rear loading aid 208 in transfer direction 210 is positioned against the stop device 297, as shown in FIG. 5d. If the loading aid 208 is moved against the stop devices 297, by means of a not shown sensor, for example a light barrier, the presence of the loading aid 208 is detected and the conveying device 293 is driven and stopped by the computer system.

By means of the separation a spacing gap 285 is formed between the loading aids 208, so that the middle third stop devices 298 can also be moved into the operating position, as shown in FIG. 5e.

Afterwards the retaining element 278 is moved out of its separating position into the basic position which is lowered in relation to the conveying plane 256, so that the loading aids 208 between the stop devices 296 to 297 can be conveyed by means of the conveying device 293 along the movement path 251.

Figure 5F:
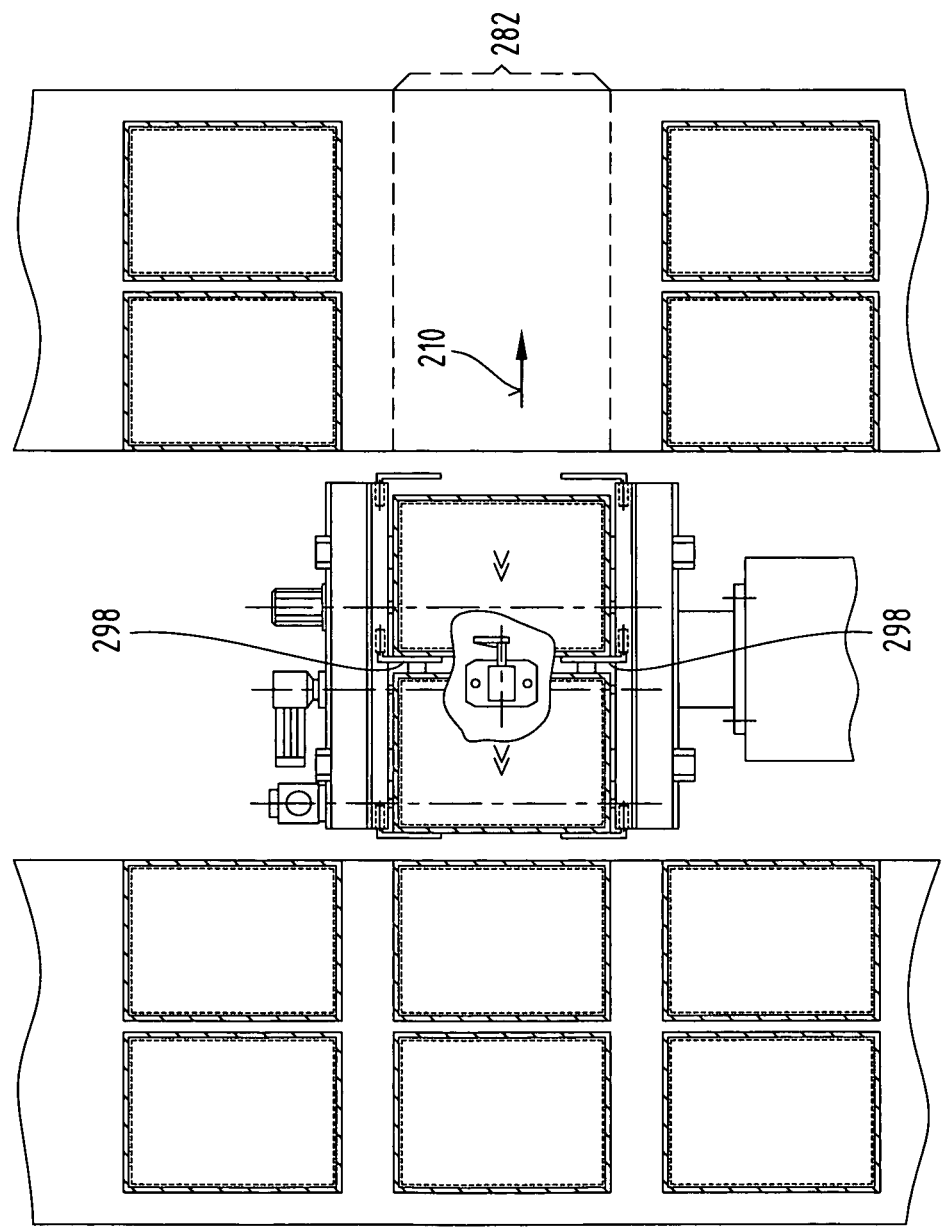

As shown in FIG. 5f, the separated loading aids 208 before they are transferred into the storage channel 282 are positioned by the drive of the conveying device 293 in a conveying direction opposite the transfer direction 210 against the stop devices 297, 298. Once the loading aids 208 are moved against the stop devices 297, 298, by means of not shown sensors, for example light barriers, the presence of the front and rear loading aids 208 is determined and the conveying device 293 is controlled and stopped by the computer system.

The insertion and removal is performed in the same manner described above.

Lastly, it should be noted that only one of the two telescopic arms 213a, 213b; 292a, 292b can be moved at right angles to their longitudinal extension. Likewise, it is also possible for the moving out unit to comprise only one telescopic arm 213a, 213b; 292a, 292b mounted on the support plate 212; 291 and/or of the two telescopic arms 213a, 213b; 292a, 292b only one telescopic arm 213a, 213b; 292a, 292b is provided with the stop devices 243 to 247; 296 to 298.

Also if in the shown exemplary embodiments the separating device 256, 257; 299 is arranged underneath the conveying plane 258, it is also possible for the latter to be arranged laterally to the movement path 251 and the retaining element 278 movable between the basic position and separating position engages in a form-fit between the side walls 254 of the loading aids 208 or in a rib, groove or bore or the like on the side wall 254 of a loading aid 208.

Likewise, the separating device 256, 257; 299 can be arranged above the movement path 251 of the loading aids 208 and thus the retaining element 278 is moved from above between the abutting loading aids 208 and in this way the loading aids 208 are spaced apart from one another by the spacing gap 285.

Finally, as a point of formality, it should be noted that for a better understanding of the structure of the transport device 207: 290 the latter and its components have not been represented true to scale in part and/or have been enlarged and/or reduced in size.

LIST OF REFERENCE NUMERALS

201 Shelf system
202 Shelf system
203 Aisle
204 Conveying unit
205 Mast
206 Platform
207 Transport device
208 Loading aids
209 Shelf compartment
210 Transfer direction
211a Storage space 211b Storage space
211c Storage space
211d Storage space
212 Support plate
213a Telescopic arm
213b Telescopic arm
214a Conveying device
214b Conveying device
215a Drive motor
215b Drive motor
216 Opening position
217 Closing position
218 Servomotor
219 Spindle
220a Storage element
220b Storage element
220c Storage element
221 Securing angle
222a Guiding arrangement
222b Guiding arrangement
223 Support frame
224 Middle slide
225 Upper slide
226 Side wall
227 Side wall
228 Side wall
229 Side wall
230 Guiding arrangement
231 Lateral guiding track
232 Height guiding track
233 Base
234 Arm
235 Guiding arrangement
236 Lateral guiding track
237 Height guiding track
238 Lower side
239 Upper side
240 Guiding web
241 Guiding web
242 Sliding strip
243 Stop device
244 Stop device
245 Stop device
246 Stop device
247 Stop device
248 Servomotor
249 Axis
250 Recess
251 Movement path
252 Sensor
253 Sensor
254 Side wall
255 Alignment surface
256 Separating device
257 Separating device
258 Conveying plane
259 Adjusting drive
260 Drive wheel
261 Guiding wheel
262 Guiding wheel
263 Click wheel
264 Pulling means
265 Drive shaft
266 Drive motor
267 Drive member
268 Pulling means
269 Pulling means
270 Clamp
271 Clamp
272 Roller
273 Clamp
274 Clamp
275 Roller
276 Guiding element
277 Guiding element
278 Retaining element
289 Stack edge
280 Servomotor
281 Holding frame
282 Storage channel
283 Prezone
284 Conveying device
285 Spacing gap
286 Rear wall
287 Length
288 Longitudinal spacing
289
290 Transport device
291 Support plate
292a Telescopic arm
292b Telescopic arm
293 Conveying device
294 Drive motor
295 Servomotor
296 Stop device
297 Stop device
298 Stop device
299 Separating device
300 Servomotor
301 Drive motor

The invention claimed is:

1. A method for positioning loading aids prior to a transfer of the loading aids into a shelf compartment on storage spaces disposed one after another using a transport device, the transport device having
a support plate,
at least one telescopic arm arranged on the support plate and equipped with a first stop device, a second stop device and a third stop device, the first and second stop devices arranged behind one another in a transfer direction, the third stop device being disposed between the first and second stop devices,
a conveying device arranged on the support plate and having ends facing away from each other and for moving a first and a second loading aid between the ends,
a separating device arranged between the ends of the conveying device and having a retaining element being adjustable into a separating position between the first and second loading aids that abut one after another in the transfer direction in order to separate the first and second loading aids,
wherein the method comprises steps of:
positioning the first and second loading aids one after another against the first stop device of the transport device in the transfer direction via the conveying device in such a manner that the first and second loading aids abut one after another in the transfer direction, afterwards
adjusting the retaining element of the separating device in a movement path between the first and second loading aids that abut one after another in the transfer direction, afterwards
positioning the first loading aid in the transfer direction against the retaining element of the separating device and positioning the second loading aid in the transfer direction against the second stop device in the transfer direction via the conveying device, thereby defining a spacing gap between the first and second loading aids, and afterwards adjusting the third stop device in the spacing gap between the first and second loading aids situated on the conveying device.

2. The method according to claim 1, further comprising a step of:

prior to the transfer of the first and second loading aids into the shelf compartment, positioning the first and second loading aids by an alignment device of the transport device parallel to the transfer direction.

3. The method according to claim 1, further comprising a step of:

prior to the transfer of the first and second loading aids into the shelf compartment, positioning the first loading aid with a rear side wall of the first loading aid in the transfer direction against the third stop device of the transport device in the transfer direction and positioning the second loading aid with a rear side wall of the second loading aid in the transfer direction against one of the first and second stop devices of the transport device in the transfer direction.

4. A method for positioning loading aids prior to a transfer of the loading aids into a shelf compartment on storage spaces disposed one after another using a transport device, the transport device having a support plate, at least one telescopic arm arranged on the support plate, equipped with a first stop device and a second stop device on opposite ends thereof, equipped with a third stop device between the first and second stop devices, equipped with a fourth stop device between the first stop device and the third stop device, and equipped with a fifth stop device between the second stop device and the third stop device, a first conveying device arranged on the support plate and for moving a first group of loading aids of the loading aids, and a second conveying device arranged on the support plate and for moving a second group of loading aids of the loading aids, a first separating device having a first retaining element being adjustable into a separating position between loading aids, and a second separating device having a second retaining element being adjustable into a separating position between loading aids, wherein the method comprises steps of:

separating the loading aids into groups of loading aids abutting one after another in a transfer direction, positioning the first group of loading aids against the first stop device via the first conveying device and positioning the second group of loading aids against the second stop device via the second conveying device, afterwards adjusting the third stop device in a spacing gap between the groups of the loading aids separated from one another, adjusting the first retaining element of the first separating device in a movement path between the loading aids of the first group and the second retaining element of the second separating device in a movement path between the loading aids of the second group, afterwards positioning a front loading aid of the loading aids of the first group against the third stop device and positioning a rear loading aid of the loading aids of the first group against the first retaining element of the first separating device via the first conveying device, thereby defining a spacing gap between the front and rear loading aids of the first group, positioning a front loading aid of the loading aids of the second group against the third stop device and positioning a rear loading aid of the loading aids of the second group against the second retaining element of the second separating device via the second conveying device, thereby defining a spacing gap between the front and rear loading aids of the second group, afterwards adjusting the fourth stop device in the spacing gap between the loading aids separated from one another via the first retaining element of the first separating device, and adjusting the fifth stop device in the spacing gap between the loading aids separated from one another via the second retaining element of the second separating device.

5. The method according to claim 4, further comprising a step of:

prior to the transfer of the loading aids of the first group into the shelf compartment, positioning the front loading aid of the loading aids of the first group with its rear side wall in the transfer direction against one of the first and fourth stop devices of the transport device in the transfer direction and positioning the rear loading aid of the loading aids of the first group with its rear side wall in the transfer direction against one of the third and fourth stop devices of the transport device in the transfer direction, and prior to the transfer of the loading aids of the second group into the shelf compartment, positioning the front loading aid of the loading aids of the second group with its rear side wall in the transfer direction against one of the third and fifth stop devices of the transport device in the transfer direction and positioning the rear loading aid of the loading aids of the second group with its rear side wall in the transfer direction against one of the second and fifth stop devices of the transport device in the transfer direction.

* * * * *